United States Patent
Mashiki et al.

(10) Patent No.: US 7,765,968 B2
(45) Date of Patent: Aug. 3, 2010

(54) VARIABLE VALVE TIMING SYSTEM AND METHOD FOR CONTROLLING THE SAME

(75) Inventors: Zenichiro Mashiki, Nisshin (JP); Yasumichi Inoue, Toyota (JP); Masayoshi Hattori, Toyota (JP); Noboru Takagi, Toyota (JP); Haruyuki Urushihata, Chiryu (JP); Masaomi Inoue, Kariya (JP); Yuuichi Takemura, Anjo (JP); Toshikazu Tanaka, Kariya (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 136 days.

(21) Appl. No.: 11/846,983

(22) Filed: Aug. 29, 2007

(65) Prior Publication Data

US 2008/0066700 A1 Mar. 20, 2008

(30) Foreign Application Priority Data

Sep. 14, 2006 (JP) .............................. 2006-249653

(51) Int. Cl.
F01L 1/34 (2006.01)
(52) U.S. Cl. ............... 123/90.17; 123/90.15; 123/90.31
(58) Field of Classification Search .............. 123/90.15, 123/90.17, 90.31
See application file for complete search history.

(56) References Cited

U.S. PATENT DOCUMENTS

2002/0195071 A1* 12/2002 Shimizu et al. .......... 123/90.16
2005/0081808 A1* 4/2005 Tani et al. ................ 123/90.17

FOREIGN PATENT DOCUMENTS

| JP | 5-284755 | 10/1993 |
| JP | 2004-183591 | 7/2004 |
| JP | 2005-218281 | 8/2005 |

* cited by examiner

Primary Examiner—Zelalem Eshete
(74) Attorney, Agent, or Firm—Oblon, Spivak, McClelland, Maier & Neustadt, L.L.P.

(57) ABSTRACT

An actuator operation amount setting unit prepares the rotational speed command value for an electric motor such that the phase of an intake valve changes in accordance with the target phase. An electric-motor EDU controls the motor supply electric power such that the electric motor operates in accordance with the rotational speed command value. An overheating determination unit determines whether at least one of the electric motor and the electric-motor EDU needs to be restricted from heating up based on a result of comparison between the information indicating the motor supply electric power and the reference value. A rotational speed command value restriction unit restricts the rotational speed command value provided to the electric-motor EDU to a value within a predetermined range, when it is determined that the at least one of the electric motor and the electric-motor EDU needs to be restricted from heating up. A reference value setting unit variably sets the reference value based on the rotational speed of the electric motor.

20 Claims, 15 Drawing Sheets

VARIABLE VALVE TIMING SYSTEM AND METHOD FOR CONTROLLING THE SAME

INCORPORATION BY REFERENCE

The disclosure of Japanese Patent Application No. 2006-249653 filed on Sep. 14, 2006 including the specification, drawings and abstract is incorporated herein by reference in its entirety.

BACKGROUND OF THE INVENTION

1. Field of the Invention

The invention relates generally to a variable valve timing system and a method for controlling the same, and, more specifically, to a variable valve timing system that uses an electric motor as an actuator and a method for controlling the same.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

With, especially, a variable valve timing system that hydraulically drives a camshaft, the variable valve timing control is sometimes not executed as accurately as it should be, in a cold environment or at the time of engine starting. Such inconvenience is caused because the hydraulic pressure used to drive the camshaft is insufficient or the response of the camshaft to the hydraulic control is slow in such occasions. To obviate such inconveniences, a variable valve timing system that drives a camshaft by means of an electric motor has been suggested. However, the passage of electric current through the electric motor causes a motor coil or a drive unit (a power converter circuit) of the electric motor to heat up. Accordingly, the electric motor needs to be monitored to prevent the motor coil or the drive unit from overheating.

For example, Japanese Patent Application Publication No. JP-2004-183591 (JP-A-2004-183591) describes a control over an internal combustion engine provided with a variable valve timing system that uses an electric motor. In the control, whether the electric motor has overheated is determined based on, for example, the value of electric current passing through the electric motor during a predetermined period. If it is determined that the electric motor has overheated, the valve characteristic is brought to and maintained at a predetermined characteristic, and the throttle valve control appropriate for such operation mode is executed. In this way, the electric motor is protected from overheating.

Japanese Patent Application Publication No. JP-2005-218281 (JP-A-2005-218281) describes a control executed by a drive control unit for an electric actuator, for example, a valve-lift variable mechanism. In the control, the levels of drive currents used to drive the electric actuator are detected, and the average value of the drive current levels is calculated. When the momentary value of the drive current level is equal to or higher than the limit value, or when the level of the average value is continuously kept equal to or higher than the limit value for a predetermined period or longer, the operation of the electric actuator is forcibly stopped. Executing such control protects the electric actuator and a drive circuit for the electric actuator from an overcurrent, and minimizes thermal degradation of a substrate of the drive circuit.

Japanese Patent Application Publication No. 05-284755 (JP-A-05-284755) describes an inverter control unit that calculates the accumulation value of the amounts, by which an electric motor and an inverter heat up, based on the detected load current values at an inverter unit during the operation of the inverter. The inverter control unit according to JP-A-05-284755 compares the accumulation value with the value of the protection function operation level or the value of the alarm operation level that is lower than the value of the protection function operation level. When the accumulation value is equal to or higher than the value of the alarm operation level, the power output from the inverter is reduced to prevent the inverter from abnormally stopping its operation.

As described above, in a variable valve timing system that uses an electric motor as an actuator, protection of the electric motor and a drive unit (e.g. an inverter, a converter) from overheating is an important issue to be addressed. Especially, the reference value, based on which whether the electric motor has overheated is determined, should be appropriately set. Otherwise, overheating of the electric motor fails to be detected, which leads to occurrence of a malfunction in a device, or overheating of the electric motor is detected excessively sensitively, which reduces the efficiency of the valve timing control due to excessive restriction on the operation of the actuator.

To address such inconvenience, JP-A-2004-183591 describes a technology for determining whether an electric motor has overheated by comparing the duty ratio used in the on/off control over a transistor arranged within an electric motor drive unit, with the reference value. The duty ratio is set according to the pulse width modulation control (PWM control) executed when the electric motor is driven. JP-A-2004-183591 describes a modified example in which the reference value is changed based on the temperature of an engine. However, JP-A-2004-183591 does not provide any description concerning the need to change the reference value based on the operating state of the electric motor, especially, based on the motor speed.

According to each of JP-A-2005-218281 and JP-A-05-284755, the reference value used to determine whether the electric motor has overheated is basically a fixed value. JP-A-2005-218281 and JP-A-05-284755 do not provide any description concerning the need to change the reference value based on the operating state of the electric motor, as in the case of JP-A-2004-183591.

SUMMARY OF THE INVENTION

The invention provides a variable valve timing system that uses an electric motor as an actuator and a method for controlling the same, with which elements of the electric motor and an electric motor drive unit are protected from malfunctions by appropriately determining whether the electric motor has overheated based on the operating state thereof, while reduction in the efficiency of the valve timing control due to excessive protection from overheating is prevented.

A first aspect of the invention relates to a variable valve timing system that changes opening/closing timing of at least one of an intake valve and an exhaust valve provided in an engine and opened/closed by a camshaft. The variable valve timing system includes a changing mechanism, a command value preparation unit, an electric motor drive unit, a reference value setting unit, an overheating determination unit, and a command value restriction unit. An electric motor is used as an actuator. The changing mechanism is structured to change the opening/closing timing of the intake valve or the exhaust valve in accordance with the operation amount of the actuator. The command value preparation unit obtains the current value of the opening/closing timing at least based on a signal from a sensor that detects the rotational speed of the camshaft and a signal from a sensor that detects the rotational speed of the electric motor, and prepares the operation command value for the electric motor based on the deviation of the current value of the opening/closing timing from the target value of the opening/closing timing, which is set based on the operating state of the engine, such that the opening/closing timing changes in accordance with the target value. The electric motor drive unit controls the amount of electric power supplied to the electric motor such that the electric motor operates in accordance with the operation command value provided from the command value preparation unit. The reference value setting unit variably sets the reference value used to control the amount of electric power supplied from the electric motor drive unit to the electric motor in accordance with one of the rotational speed of the electric motor and the rotational speed of the engine. The overheating determination unit determines whether at least one of the electric motor and the electric motor drive unit needs to be restricted from heating up based on a result of comparison between information indicating the amount of electric power supplied from the electric motor drive unit to the electric motor and the reference value. The command value restriction unit restricts the operation command value for the electric motor to a value within a predetermined range when the overheating determination unit determines that at least one of the electric motor and the electric motor drive unit needs to be restricted from heating up.

With the variable valve timing system according to the first aspect of the invention, the fact that an overheated portion in the electric motor and the electric motor drive unit (electric-motor EDU) changes depending on the rotational speed of the electric motor is taken into account. Accordingly, whether the electric motor and the electric-motor EDU need to be restricted from heating up is appropriately determined. In addition, when the electric motor and the drive unit have overheated, the operation amount of the electric motor is restricted to a value within a predetermined range, whereby the electric motor and the drive unit are restricted from heating up. As a result, elements of the electric motor and the electric motor drive unit are protected from malfunctions by appropriately preventing the electric motor and the drive unit from overheating, while reduction in the efficiency of the valve timing control due to excessive protection from overheating is prevented.

In the first aspect of the invention, the overheating determination unit may determine that the electric motor and the electric motor drive unit need to be restricted from heating up, when the duration during which the amount of electric power supplied to the electric motor, which is indicated by the information, is continuously larger than the reference value is longer than the first reference duration.

With this configuration, it is possible to appropriately determine whether the electric motor and the electric motor drive unit have overheated by determining whether the duration during which the amount of electric power supplied to the electric motor is continuously larger than the reference value is longer than the first reference duration.

In the first aspect of the invention, after determining that the electric motor and the electric motor drive unit need to be restricted from heating up, the overheating determination unit may determine that restriction on the electric motor and the electric motor drive unit from heating up is no longer required when the duration during which the amount of electric power supplied to the electric motor, which is indicated by the information, is continuously equal to or smaller than the reference value is longer than the second reference duration.

With this configuration, when the amount of electric power supplied to the electric motor is continuously restricted after the electric motor and the electric motor drive unit are restricted from heating up due to the determination that the electric motor and the electric motor drive unit have overheated, the restriction on heating may be cancelled and the normal valve timing control may be restarted. Thus, the valve timing control is executed efficiently.

In the first aspect of the invention, the overheating determination unit may includes an accumulation unit that accumulates the duration during which the amount of electric power supplied to the electric motor, which is indicated by the information, is continuously larger than the reference value. The duration accumulated by the accumulation unit may be cleared when the duration during which the amount of electric power supplied to the electric motor, which is indicated by the information, is continuously equal to or smaller than the reference value is longer than a second reference duration. The second reference duration used when the overheating determination unit determines that the electric motor and the electric motor drive unit need to be restricted from heating up may be set to be longer than the second reference duration used when the overheating determination unit determines that restriction on the electric motor and the electric motor drive unit from heating up is not required.

With this configuration, whether the electric motor and the electric motor drive unit have overheated is determined based on the accumulated value obtained by the accumulation unit (counter) used for an overheating determination. In addition, the condition for clearing the accumulation value is changed between before and after it is determined the electric motor and the electric motor drive unit need to be restricted from heating up. As a result, when the electric motor and the electric motor drive unit have overheated, the elements thereof are effectively protected from malfunctions. On the other hand, when the electric motor and the electric motor drive unit have not overheated, excessive protection of the elements is prevented in order to maintain the efficiency of the valve timing control.

In the first aspect of the invention, the changing mechanism may be structured to change the opening/closing timing of the intake valve or the exhaust valve in a direction, which is determined based on whether the rotational speed of the electric motor relative to the rotational speed of the camshaft that drives the intake valve or the exhaust valve takes a positive value or a negative value, and at a rate that is determined based on the degree of the rotational speed of the electric motor relative to the rotational speed of the camshaft. The command value preparation unit may prepare the rotational speed command value for the electric motor as the operation command value by adding the rotational speed of the electric motor relative to the rotational speed of the camshaft, which corresponds to the deviation of the current value of the opening/closing timing from the target value of the opening/closing timing, to the rotational speed of the camshaft. The electric motor drive unit may control the amount of electric power supplied to the electric motor such that the rotational speed of the electric motor matches the rotational speed command value.

According to the configuration described above, the changing mechanism is structured to change the opening/closing timing of the valve in accordance with the rotational speed of the electric motor relative to the rotational speed of the camshaft. As a result, it is possible to appropriately prevent overheating of the electric motor and the electric motor drive unit to protect the elements thereof from malfunctions.

When the reference value setting unit sets the reference value based on the rotational speed of the engine in the first aspect, the rotational speed of the electric motor basically changes in accordance with the rotational speed of the engine. Based on this fact, the changing mechanism that is structured as described above sets the reference value used to determine whether the electric motor and the electric motor drive unit have overheated based on the rotational speed of the engine that changes more smoothly than the motor speed. Thus, an abrupt change in the reference value is prevented, and whether the electric motor and the electric motor drive unit have overheated is determined more stably.

In the first aspect of the invention, the predetermined range used by the command value restriction unit may be set based on the rotational speed of the engine. The predetermined range may be set to include the region where the rotational speed of the electric motor is higher than the rotational speed of the camshaft, the region where the rotational speed of the electric motor is lower than the rotational speed of the camshaft, and the region where the rotational speed of the electric motor is equal to the rotational speed of the camshaft.

With this configuration, even when the electric motor and the electric motor drive unit are restricted from heating up due to the determination that they have overheated, the valve timing is both advanced and delayed.

A second aspect of the invention relates to a method for controlling a variable valve timing system that changes opening/closing timing of at least one of an intake valve and an exhaust valve provided in an engine and opened/closed by a camshaft, and that includes a changing mechanism, and an electric motor drive unit. An electric motor is used as an actuator. The changing mechanism is structured to change the opening/closing timing of the intake valve or the exhaust valve in accordance with the operation amount of the actuator. The electric motor drive unit controls the amount of electric power supplied to the electric motor to drive the electric motor. According to the method, the current value of the opening/closing timing is obtained at least based on a signal from a sensor that detects the rotational speed of the camshaft and a signal from a sensor that detects the rotational speed of the electric motor. The operation command value for the electric motor is prepared based on the deviation of the current value of the opening/closing timing from the target value of the opening/closing timing, which is set based on the operating state of the engine, such that the opening/closing timing changes in accordance with the target value. The amount of electric power supplied from the electric motor drive unit to the electric motor is controlled in accordance with the operation command value. The reference value used to control the amount of electric power supplied from the electric motor drive unit to the electric motor is set in accordance with one of the rotational speed of the electric motor and the rotational speed of the engine. Whether at least one of the electric motor and the electric motor drive unit needs to be restricted from heating up is determined based on a result of comparison between information indicating the amount of electric power supplied from the electric motor drive unit to the electric motor and the reference value. When it is determined that at least one of the electric motor and the electric motor drive unit needs to be restricted from heating up, the operation command value for the electric motor is restricted to a value within a predetermined range.

The aspects of the invention described above provide the variable valve timing system that uses the electric motor as the actuator and the method for controlling the same, with which the elements of the electric motor and the electric motor drive unit are protected from malfunctions by appropriately determining whether the electric motor has overheated based on the operating state thereof, while reduction in the efficiency of the valve timing control due to excessive protection from overheating is prevented.

BRIEF DESCRIPTION OF THE DRAWINGS

The foregoing and further objects, features and advantages of the invention will become apparent from the following description of an embodiment with reference to the accompanying drawings, wherein the same or corresponding elements will be denoted by the same reference numerals and wherein.

DETAILED DESCRIPTION OF THE EMBODIMENT

Figure 1:
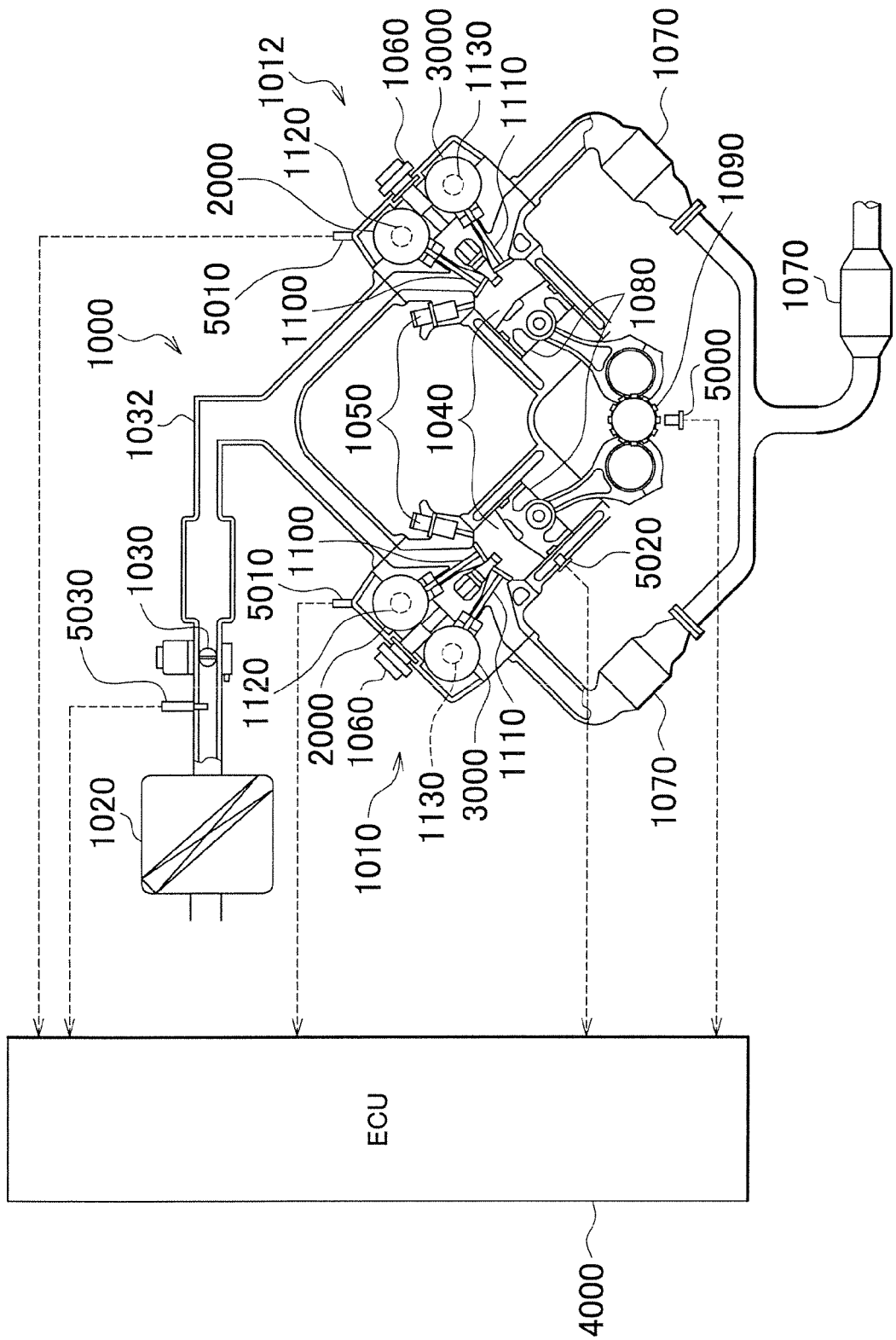
FIG. 1 is a view schematically showing the structure of a vehicle engine provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

First, a vehicle engine provided with a variable valve timing system according to the embodiment of the invention will be described with reference to FIG. 1.

An engine 1000 is an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
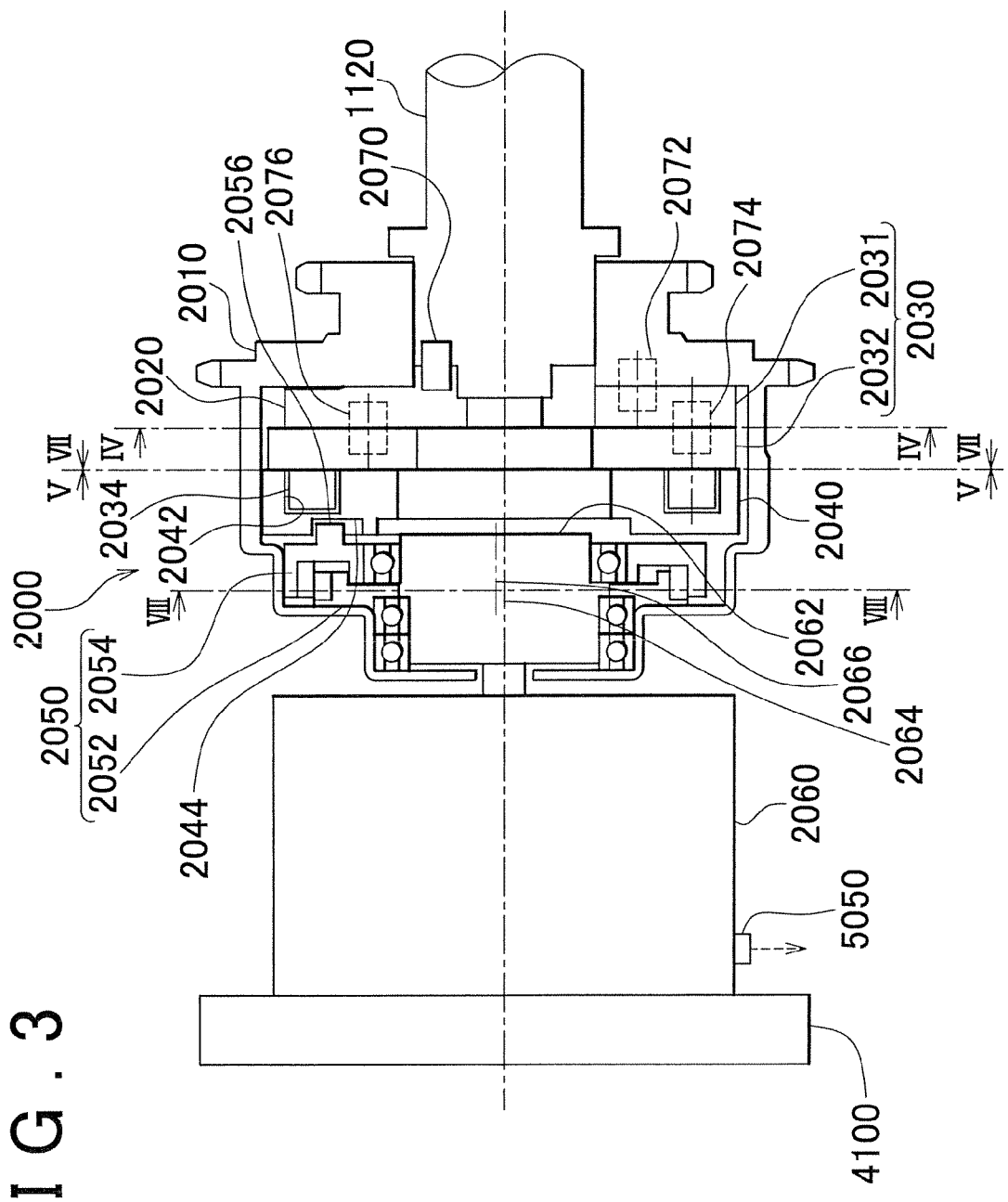
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

Figure 2:
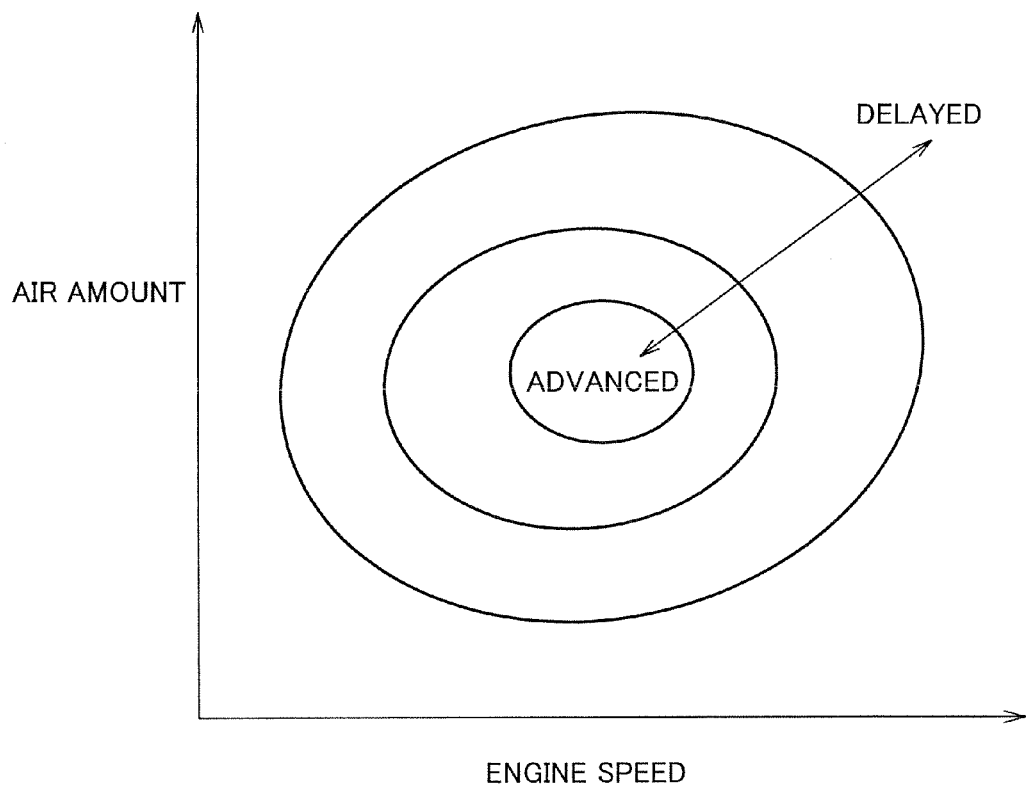
FIG. 2 is a graph showing the map that defines the phase of an intake camshaft.

According to the embodiment of the invention, the ECU 4000 sets the target phase of the intake valve 1100 based on the map that uses parameters indicating the engine operating state, typically, the map that uses the engine speed NE and the intake air amount KL as parameters, as shown in FIG. 2. Generally, multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below. Alternatively, each of the intake VVT mechanism 2000 and the exhaust VVT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060. An electric-motor EDU 4100 used to control the electric motor 2060 is formed integrally with the electric motor 2060. The electric motor 2060 and the electric-motor EDU 4100 may be housed in the same case. Alternatively, the electric motor 2060 and the electric-motor EDU 4100 may be accommodated in the individual cases, and then connected to each other.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
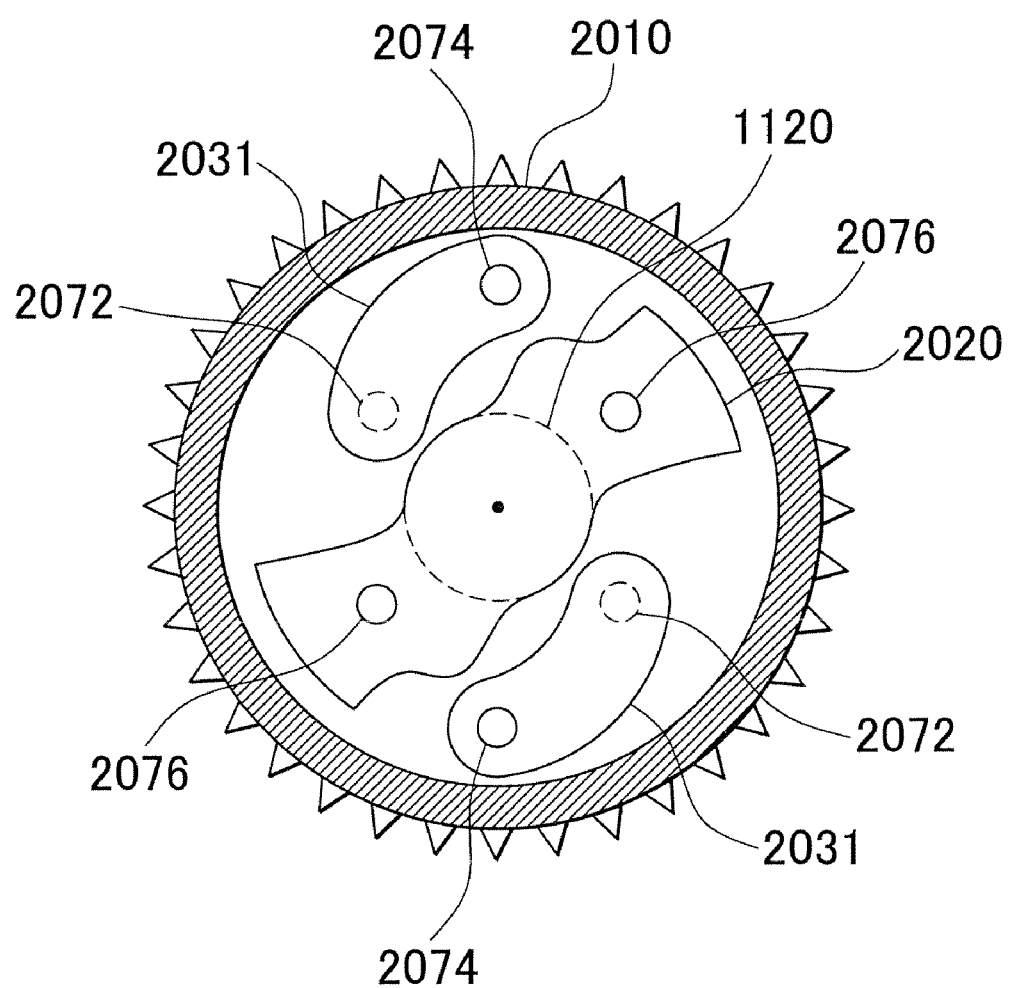
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the intake camshaft 1120. Each first arm 2031 is connected to the sprocket 2010 so as to pivot about a second pin 2072.

Figure 5:
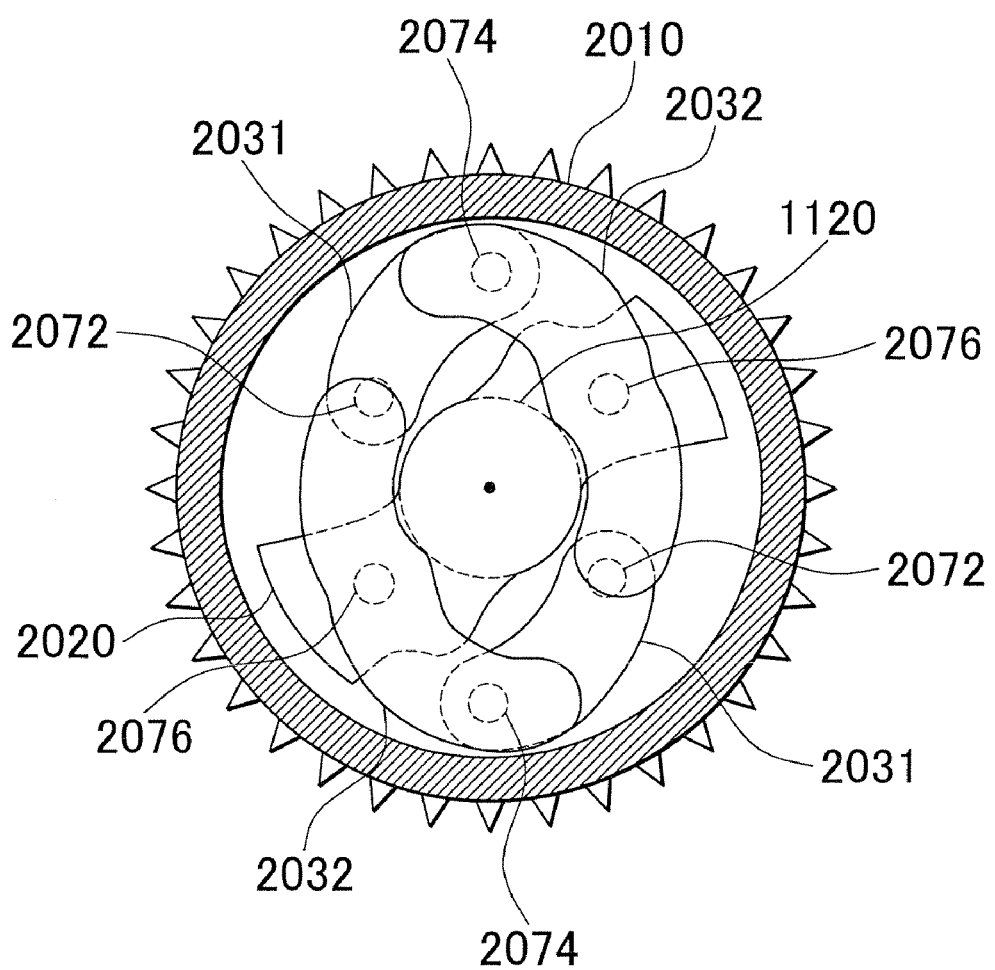
FIG. 5 is a first cross-sectional view taken along the line V-V in FIG. 3.
Figure 6:
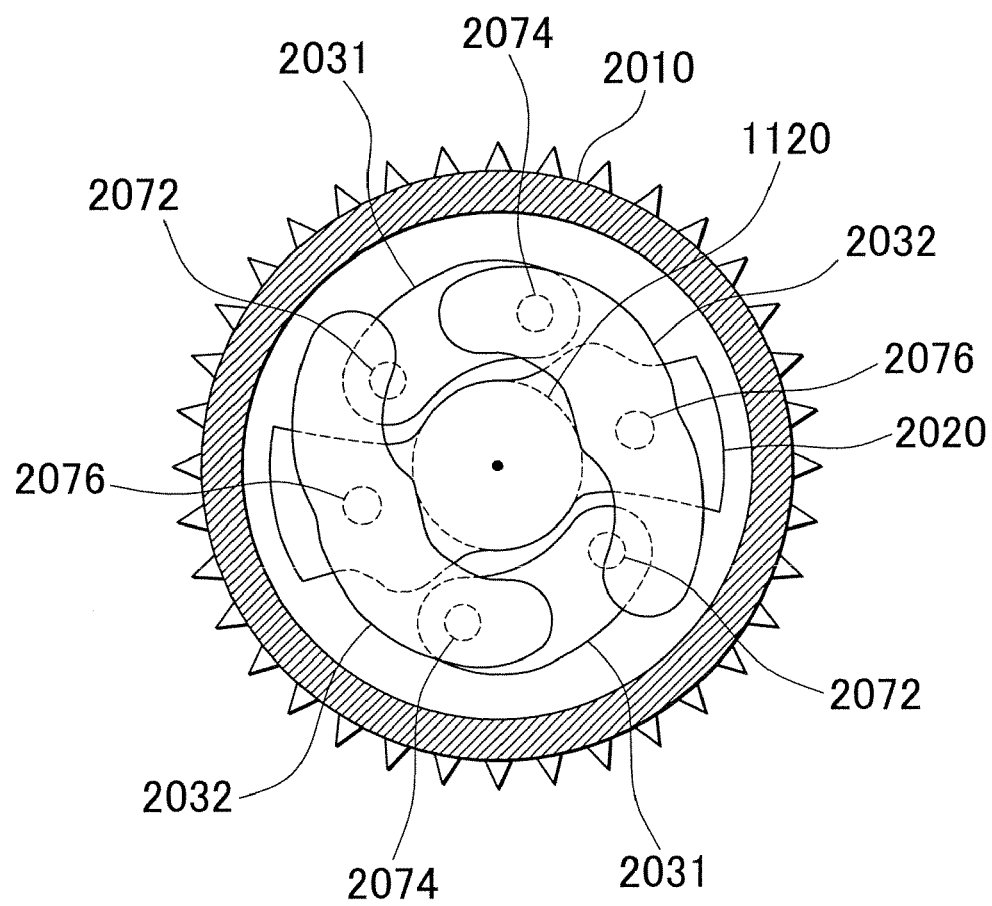
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
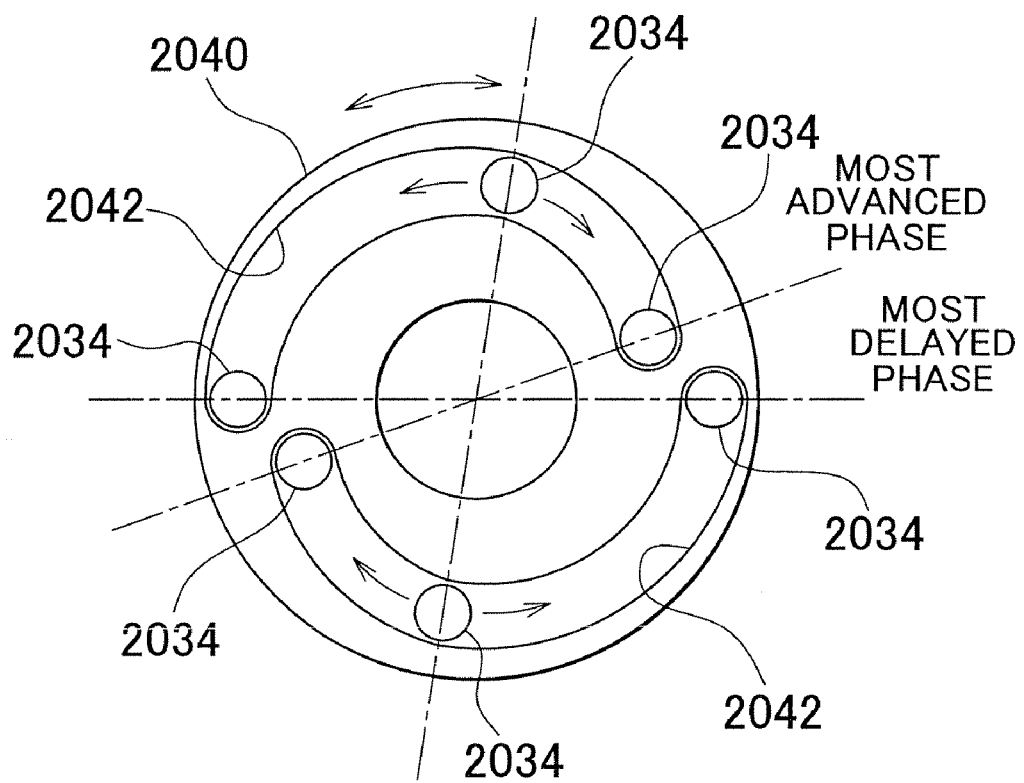
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
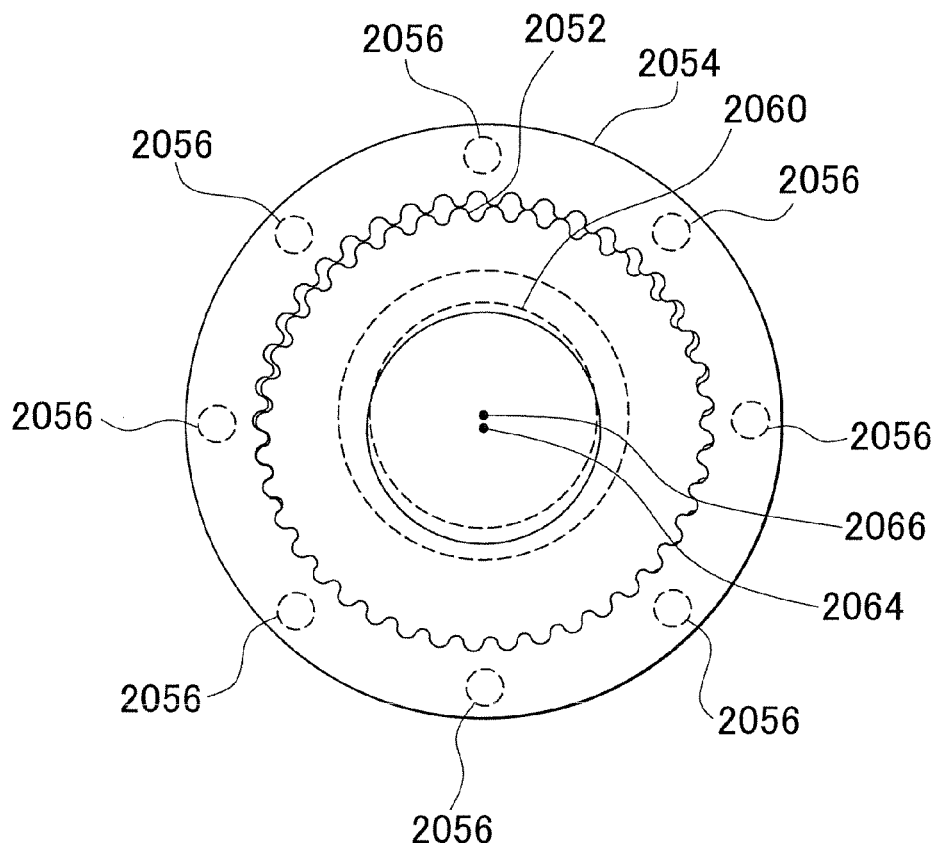
FIG. 8 is a cross-sectional view taken along the line VIII-VIII in FIG. 3.

FIG. 8 shows a cross-sectional view taken along the line VIII-VIII in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" where appropriate) is detected based on the signal output from the motor rotational angle sensor 5050.

Figure 9:
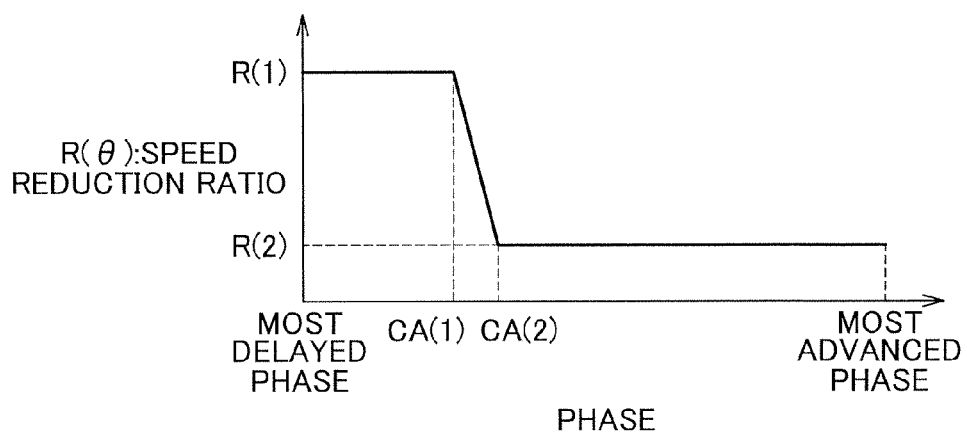
FIG. 9 is a graph showing the speed reduction ratio that the elements of the intake VVT mechanism realize in cooperation.

As shown in FIG. 9, the speed reduction ratio R (θ) that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within the first region that extends from the most delayed phase to CA1, the speed reduction ratio that the elements of the intake VVT mechanism 2000 realize in cooperation is R1. When the phase of the intake valve 1100 is within the second region that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within the third region that extends from CA1 to CA2, the speed reduction ratio that the elements of the intake VVT mechanism 2000 realize in cooperation changes at a predetermined rate ((R2−R1)/(CA2−CA1)).

The effects of the thus configured intake VVT mechanism 2000 of the variable valve timing system according to the embodiment of the invention will be described below.

Figure 10:
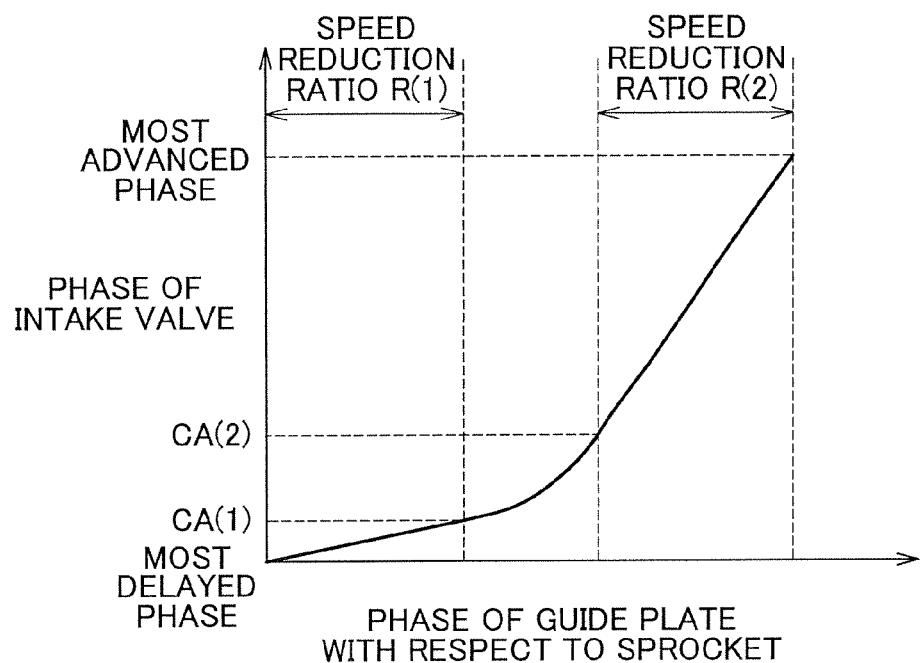
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the first region that extends from the most delayed phase to CA 1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the first region that extends from the most delayed phase to CA1, the relative rotational speed between the output shaft of the electric motor 2060 and the sprocket 2010 is reduced at the speed reduction ratio R1. As a result, the phase is delayed. When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase is delayed.

Accordingly, as long as the direction of the relative rotation between the output shaft of the electric motor 2060 and the sprocket 2010 remains unchanged, the phase of the intake valve 1100 may be advanced or delayed in both the first region that extends from the most delayed phase to CA1 and the second region that extends from the CA2 to the most advanced phase. In this case, in the second region that extends from CA2 to the most advanced phase, the phase is advanced or delayed by an amount larger than that in the first region that extends from the most delayed phase to CA1. Accordingly, the second region is broader in the phase change width than the first region.

In the first region that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is not operating, the rotation of the output shaft of the electric motor 2060, which is caused by the torque applied to the intake camshaft 1120, is restricted. This restricts the deviation of the actual phase from the phase used in the control, which is likely to occur, for example, when the engine is stopped. In addition, occurrence of an undesirable phase change is restricted when the supply of electric power to the electric motor 2060 that serves as the actuator is stopped.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is brought into a state in which combustion stably takes place in the engine 1000.

When the phase of the intake valve 1100 is within the third region that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the first region to the second region, or from the second region to the first region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

Next, the intake valve phase control executed by the variable valve timing system according to the embodiment of the invention will be described in detail.

Figure 11:
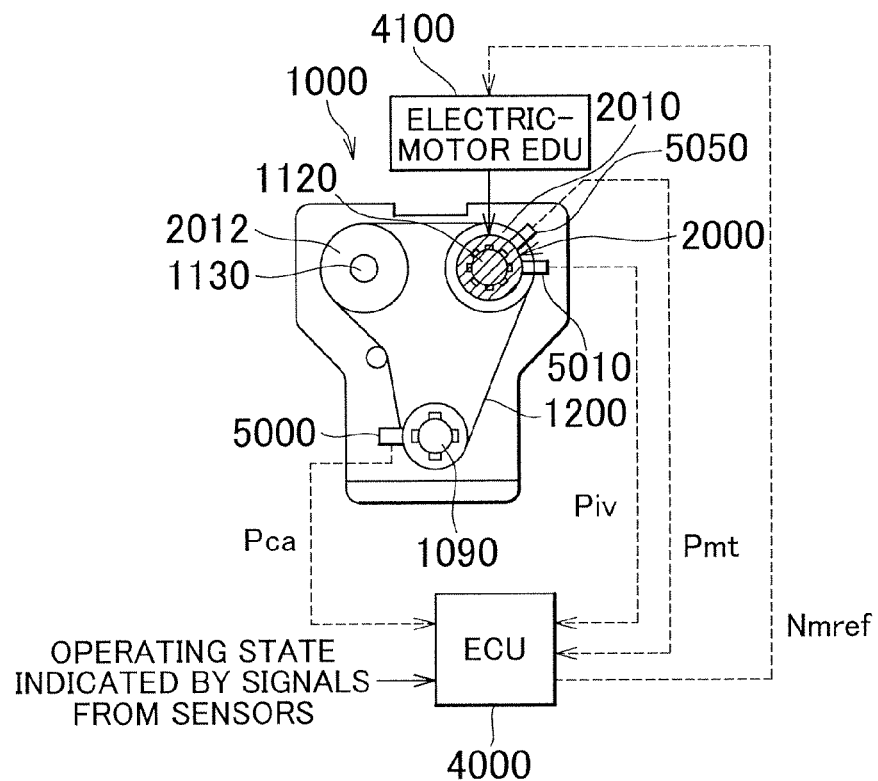
FIG. 11 is a schematic block diagram illustrating the configuration of the control over the phase of the intake valve, executed by the variable valve timing system according to the embodiment of the invention.

FIG. 11 is a schematic block diagram illustrating the configuration of the intake valve phase control executed by the variable valve timing system according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to the electric motor 2060. These cam angle signal Piv, crank angle signal Pca and motor rotational angle signal Pmt are transmitted to the ECU 4000.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 produces a required output power. As part of the engine control, the ECU 4000 sets the target value of the phase of the intake valve 1100 and the target value of the phase of the exhaust valve 1110 based on the map shown in FIG. 2. In addition, the ECU 4000 prepares the rotational speed command value Nmref for the electric motor 2060 that serves as the actuator for the intake VVT mechanism 2000. If the electric motor 2060 rotates at the rotational speed command value Nmref, the phase of the intake valve 1100 matches the target value (target phase). The rotational speed command value Nmref is set based on the relative rotational speed between the output shaft of the electric motor 2060 and the sprocket 2010 (the intake camshaft 1120), which corresponds to the operation amount of the actuator, as described in detail below.

The electric-motor EDU (Electronic Drive Unit) 4100 controls the rotational speed of the electric motor 2060 based on the rotational speed command value Nmref indicated by a signal from the ECU 4000. When the electric-motor EDU 4100 is formed integrally with the electric motor 2060 as shown in FIG. 3, the motor rotational angle sensor 5050 formed of a hall element, etc. may be arranged in the electric-motor EDU 4100. In this way, the size of the intake VVT mechanism 2000 is reduced.

Figure 12:
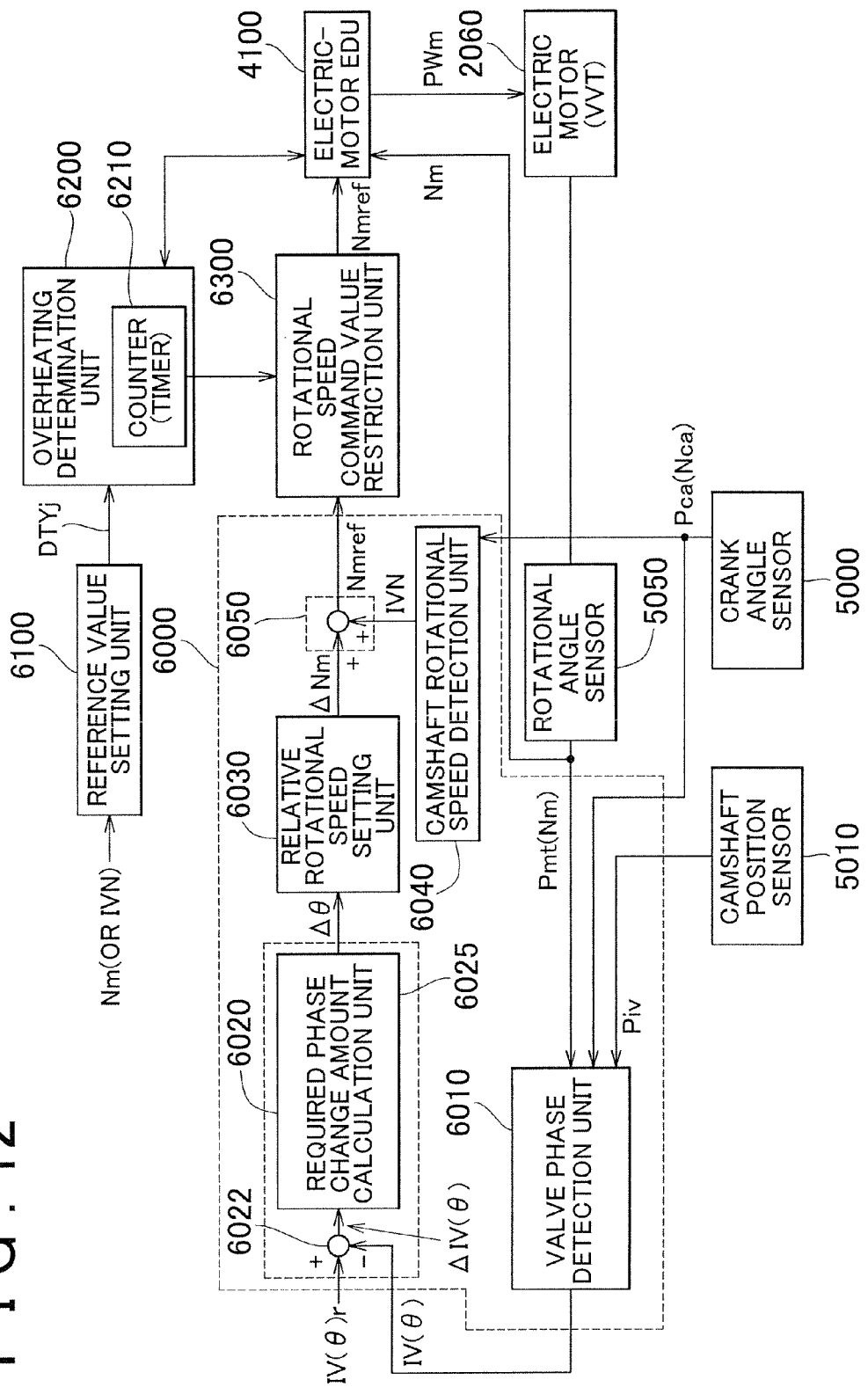
FIG. 12 is a schematic block diagram illustrating formation of the feedback control loop in the control configuration shown in FIG. 11.

FIG. 12 is a block diagram illustrating the rotational speed control over the electric motor 2060 that serves as the actuator for the intake VVT mechanism 2000 according to the embodiment of the invention.

As shown in FIG. 12, an actuator operation amount setting unit 6000, which controls the phase of the intake valve 1100 in a feedback manner, includes a valve phase detection unit 6010; a camshaft phase change amount calculation unit 6020; a relative rotational speed setting unit 6030; a camshaft rotational speed detection unit 6040; and a rotational speed command value preparation unit 6050. The elements shown in FIG. 12 correspond to the functional blocks implemented by the ECU 4000. Usually, the functions of the elements are exhibited by executing the control routines stored in the ECU 4000 in advance in predetermined control cycles.

The valve phase detection unit 6010 calculates the actual phase IV($\theta$) of the intake valve 1100 (hereinafter, referred to as the "actual intake valve phase IV($\theta$)) based on the crank angle signal Pca from the crank angle sensor 5000, the cam angle signal Piv from the camshaft position sensor 5010, and the motor rotational angle signal Pmt from the rotational angle sensor 5050 for the electric motor 2060.

The camshaft phase change amount calculation unit 6020 includes a calculation unit 6022 and a required phase change amount calculation unit 6025. The calculation unit 6022 calculates the deviation $\Delta IV(\theta)$ ($\Delta IV(\theta)=IV(\theta)-IV(\theta)r$) of the actual intake valve phase IV($\theta$) from the target phase IV($\theta$)r. The required phase change amount calculation unit 6025 calculates the amount $\Delta\theta$ by which the phase of the intake camshaft 1120 is required to change (hereinafter, referred to as the "required phase change amount $\Delta\theta$ for the intake camshaft 1120") in the current control cycle based on the deviation $\Delta IV(\theta)$ calculated by the calculation unit 6022.

For example, the maximum control amount $\theta$max, which is the maximum value of the required phase change amount $\Delta\theta$ in a single control cycle, is set in advance. The required phase change amount calculation unit 6025 sets the required phase change amount $\Delta\theta$, which corresponds to the deviation $\Delta IV$($\theta$) and which is equal to or smaller than the maximum control amount $\theta$max. The maximum control amount $\theta$max may be a fixed value. Alternatively, the maximum control amount $\theta$max may be variably set by the required phase change amount calculation unit 6025 based on the operating state of the engine 1000 (the engine speed, the intake air amount, etc.) and the deviation $\Delta IV(\theta)$ of the actual intake valve phase IV($\theta$) from the target phase IV($\theta$)r.

The relative rotational speed setting unit 6030 calculates the rotational speed $\Delta Nm$ of the output shaft of the electric motor 2060 relative to the rotational speed of the sprocket 2010 (the intake camshaft 1120). The rotational speed $\Delta Nm$ needs to be achieved in order to obtain the required phase change amount $\Delta\theta$ calculated by the required phase change amount calculation unit 6025. For example, the relative rotational speed $\Delta Nm$ is set to a positive value ($\Delta Nm>0$) when the phase of the intake valve 1100 is advanced. On the other hand, when the phase of the intake valve 1100 is delayed, the relative rotational speed $\Delta Nm$ is set to a negative value ($\Delta Nm<0$). When the current phase of the intake valve 1100 is maintained ($\Delta\theta=0$), the relative rotational speed $\Delta Nm$ is set to a value substantially equal to zero ($\Delta Nm=0$).

The relationship between the required phase change amount $\Delta\theta$ per unit time $\Delta T$ corresponding to one control cycle and the relative rotational speed $\Delta Nm$ is expressed by Equation 1 shown below. In Equation 1, R($\theta$) is the speed reduction ratio that changes in accordance with the phase of the intake valve 1100, as shown in FIG. 9.

$$\Delta\theta \propto \Delta Nm \times 360° \times (1/R(\theta)) \times \Delta T \qquad \text{Equation 1}$$

According to Equation 1, the relative rotational speed setting unit 6030 calculates the rotational speed $\Delta Nm$ of the electric motor 2060 relative to the rotational speed of the sprocket 2010, the relative rotational speed $\Delta Nm$ being required to be achieved to obtain the required phase change amount $\Delta\theta$ of the camshaft during the control cycle $\Delta T$.

The camshaft rotational speed detection unit 6040 calculates the rotational speed of the sprocket 2010, namely, the actual rotational speed IVN of the intake camshaft 1120 by dividing the rotational speed of the crankshaft 1090 by two. Alternatively, the camshaft rotational speed detection unit 6040 may calculate the actual rotational speed IVN of the intake camshaft 1120 based on the cam angle signal Piv from the camshaft position sensor 5010. Generally, the number of cam angle signals output during one rotation of the intake camshaft 1120 is smaller than the number of crank angle signals output during one rotation of the crankshaft 1090. Accordingly, the accuracy of detection is enhanced by detecting the camshaft rotational speed IVN based on the rotational speed of the crankshaft 1090.

The rotational speed command value preparation unit 6050 prepares the rotational speed command value Nmref for the electric motor 2060 by adding the actual rotational speed IVN of the intake camshaft 1120, which is calculated by the camshaft rotational speed detection unit 6040, to the relative rotational speed $\Delta Nm$ set by the relative rotational speed setting unit 6030. As described above, the actuator operation amount setting unit 6000 detects the phase of the intake valve 1100, and prepares the rotational speed command value Nmref for the electric motor 2060 to control the phase of the intake valve 1100 in a feedback manner such that the phase of the intake valve 1100 matches the target phase.

According to the embodiment of the invention, a reference value setting unit 6100, an overheating determination unit 6200, and a rotational speed command value restriction unit 6300 are provided to protect the electric motor 2060 and the electric-motor EDU 4100 from overheating.

The overheating determination unit 6200 makes an overheating determination as to whether the electric motor 2060 and the electric-motor EDU 4100 need to be restricted from heating up based on the result of comparison between the reference value DTYj set by the reference value setting unit 6100 and the information concerning the electric motor control from the electric-motor EDU 4100. The overheating determination unit 6200 includes a counter 6210 that has a function as a timer and that is used for the overheating determination. The reference value setting unit 6100 sets the reference value DTYj used for the overheating determination based on the rotational speed of the electric motor 2060.

When the overheating determination unit 6200 determines that the electric motor 2060 and the electric-motor EDU 4100 need to be restricted from heating up, the rotational speed command value restriction unit 6300 restricts the rotational speed command value Nmref set by the actuator operation amount setting unit 6000 to a value within a predetermined range, and transmits a signal indicating the thus obtained rotational speed command value Nmref to the electric-motor EDU 4100. On the other hand, when the overheating determination unit 6200 determines that neither the electric motor 2060 nor the electric-motor EDU 4100 needs to be restricted from heating up, the rotational speed command value restriction unit 6300 does not make any restriction on the rotational speed command value Nmref, and a signal indicating the rotational speed command value Nmref set by the actuator operation amount setting unit 6000 is transmitted to the electric-motor EDU 4100.

Next, the control over the electric motor 2060 executed by the electric-motor EDU 4100 will be described. The electric-motor EDU 4100 executes the rotational speed control such that the rotational speed of the electric motor 2060 matches the rotational speed command value Nmref. For example, the electric-motor EDU 4100 controls the on/off state of a power semiconductor element (e.g. a transistor) to control the electric power supplied to the electric motor 2060 (typically, the magnitude of electric current passing through the electric motor and the amplitude of the voltage applied to the electric motor) based on the deviation (Nmref−Nm) of the actual rotational speed Nm of the electric motor 2060 from the rotational speed command value Nmref. For example, the duty ratio used in the on/off operation of the power semiconductor element is controlled.

In order to control the electric motor 2060 more efficiently, the electric-motor EDU 4100 controls the duty ratio DTY that is the adjustment amount by which the electric power supplied to the electric motor 2060 is controlled according to Equation 2 shown below.

$$DTY = DTY(ST) + DTY(FB) \quad \text{Equation 2}$$

In Equation 2, DTY(FB) is a feedback term based on the control calculation using the above-described deviation and a predetermined control gain (typically, common P control or PI control).

Figure 13:
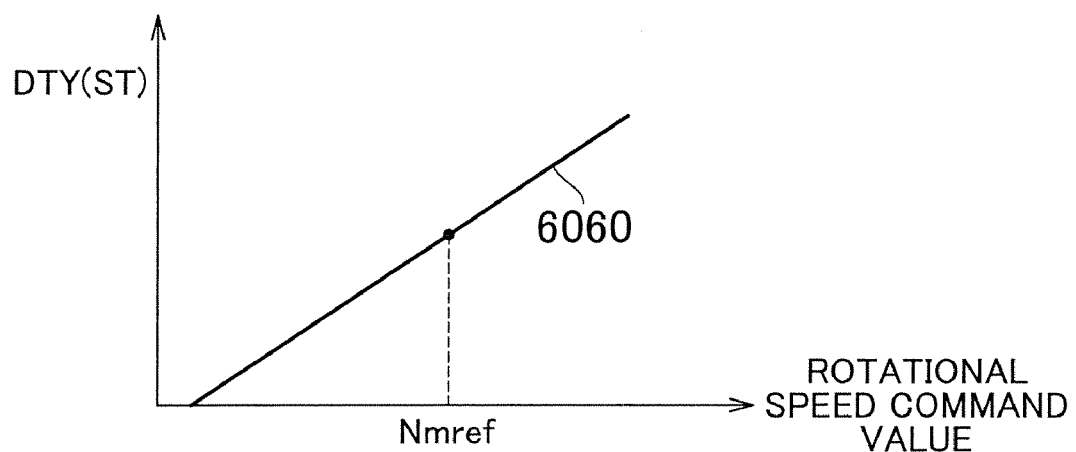
FIG. 13 is a graph illustrating the control over the rotational speed of an electric motor.

DTY(ST) in Equation 2 is a preset term that is set based on the rotational speed command value Nmref for the electric motor 2060, as shown in FIG. 13.

As shown in FIG. 13, a duty ratio characteristic 6060 corresponding to the motor current value required when the relative rotational speed ΔNm is zero (ΔNm=0), namely, when the electric motor 2060 is rotated at the same rotational speed as the sprocket 2010 based on the rotational speed command value Nmref is presented in a table in advance. DTY(ST) in Equation 2 is set based on the duty ratio characteristic 6060. Alternatively, DTY(ST) in Equation 2 may be set by relatively increasing or decreasing the value of the duty ratio corresponding to the relative rotational speed ΔNm from the reference value based on the duty ratio characteristic 6060.

The rotational speed control, in which the electric power supplied to the electric motor 2060 is controlled using both the preset term and the feedback term in combination, is executed. In this way, the electric-motor EDU 4100 causes the rotational speed of the electric motor 2060 to match the rotational speed command value Nmref, even if it changes, more promptly than in a simple feedback control, namely, the rotational speed control in which the electric power supplied to the electric motor 2060 is controlled using only the feedback term DTY(FB) in Equation 2.

Figure 14:
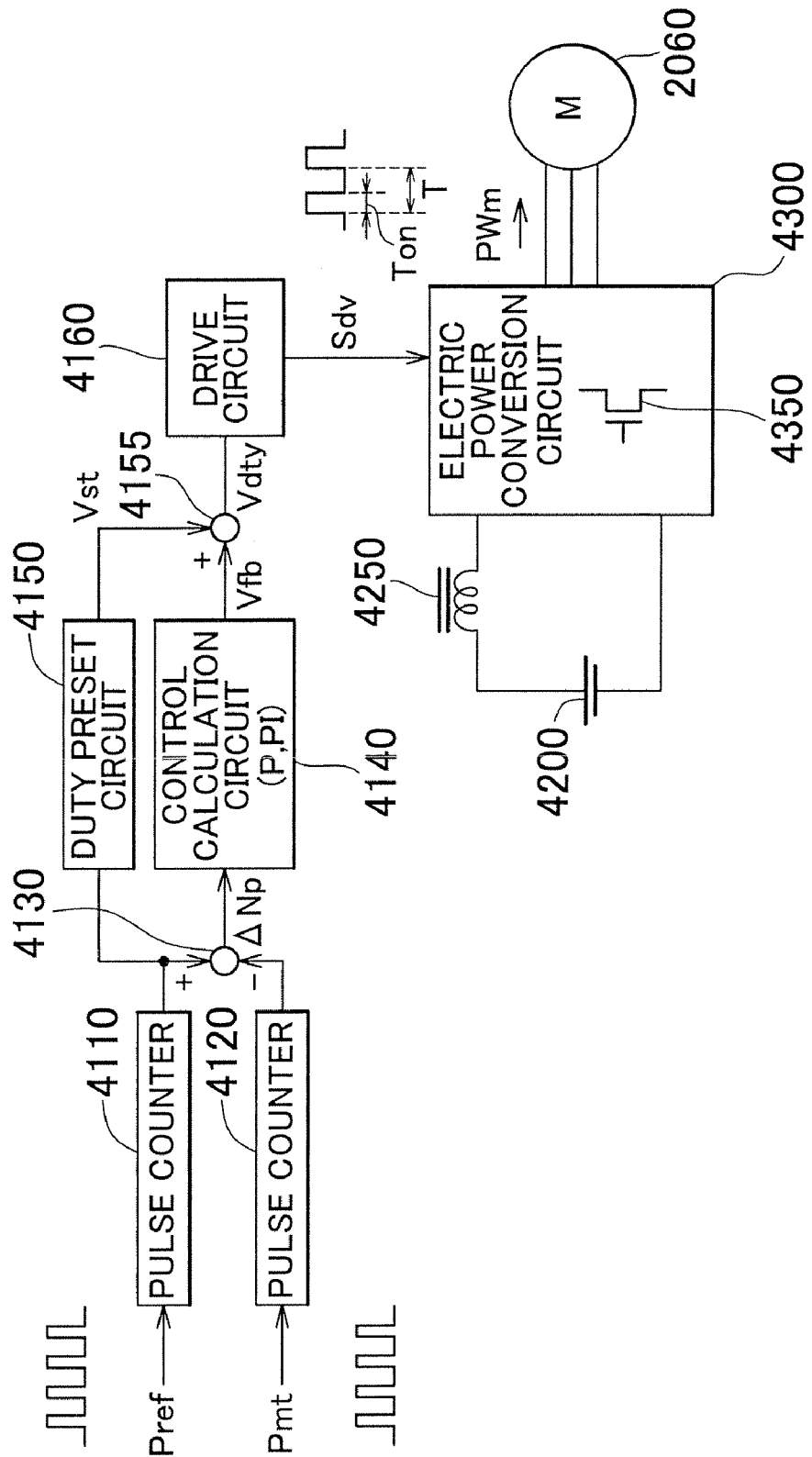
FIG. 14 is a functional block diagram illustrating a concrete example of the configuration of an electric-motor EDU.

FIG. 14 is a functional block diagram illustrating the concrete configuration of the electric-motor EDU 4100. As shown in FIG. 14, the electric-motor EDU 4100 includes pulse counters 4110 and 4120, a subtraction circuit 4130, a control calculation circuit 4140, a duty preset circuit 4150, an addition circuit 4155, a drive circuit 4160, a filter coil 4250, and an electric power conversion circuit 4300.

The pulse counter 4110 counts the number of pulses of the pulse signal Pref indicating the rotational speed command value Nmref from the ECU 4000. The pulse signal Pref has a frequency corresponding to the rotational speed command value Nmref. The pulse counter 4120 counts the number of pulses of the motor rotational angle signal Pmt. The subtraction circuit 4130 outputs a signal indicating the difference ΔNp between the number of pulses counted by the pulse counter 4110 and the number of pulses counted by the pulse counter 4120. Namely, the signal output from the subtraction circuit 4130 corresponds to the deviation of the rotational speed of the electric motor 2060 from the rotational speed command value Nmref.

The control calculation circuit 4140 outputs a signal indicating the adjustment amount based on the deviation of the rotational speed of the electric motor 2060 from the rotational speed command value Nmref, namely, the control voltage Vfb that indicates the feedback term DTY(FB) in Equation 2 according to a known control calculation method, for example, P control or PI control. The duty preset circuit 4150 outputs a signal indicating the control voltage Vst that indicates the preset term DTY in Equation 2 based on the duty ratio characteristic 6060 shown in FIG. 13, according to the signal output from the pulse counter 4110.

The addition circuit 4155 outputs a signal indicating the control voltage Vdty that is the sum of the control voltage Vfb indicated by the signal from the control calculation circuit 4140 and the control voltage Vst indicated by the signal from the duty preset circuit 4150. The control voltage Vdty is the voltage indicating the duty ratio DTY in Equation 2.

The electric power conversion circuit 4300 is formed of a common inverter or converter. The electric power conversion circuit 4300 converts the direct-current power supplied from a direct current power supply 4200 through the filter coil 4250 into the motor supply electric power PWm used to drive the electric motor 2060 through the on/off control (switching control) over the transistor 4350 shown as a typical example of the power semiconductor element. The motor supply electric power PWm for the electric motor 2060 is variably controlled based on the duty ratio DTY used in the switching control over the transistor 4350.

Usually, the electric motor 2060 is formed of a DC brushless motor. The electric-motor EDU 4100 shown in FIG. 14 controls the motor supply electric power PWm such that the rotational speed of the electric motor 2060 matches the rotational speed command value Nmref.

The overheating protection control executed by the overheating determination unit 6200 and the rotational speed command value control unit 6300 over the electric motor 2060 and the electric-motor EDU 4100 will be described in detail below.

Figure 15:
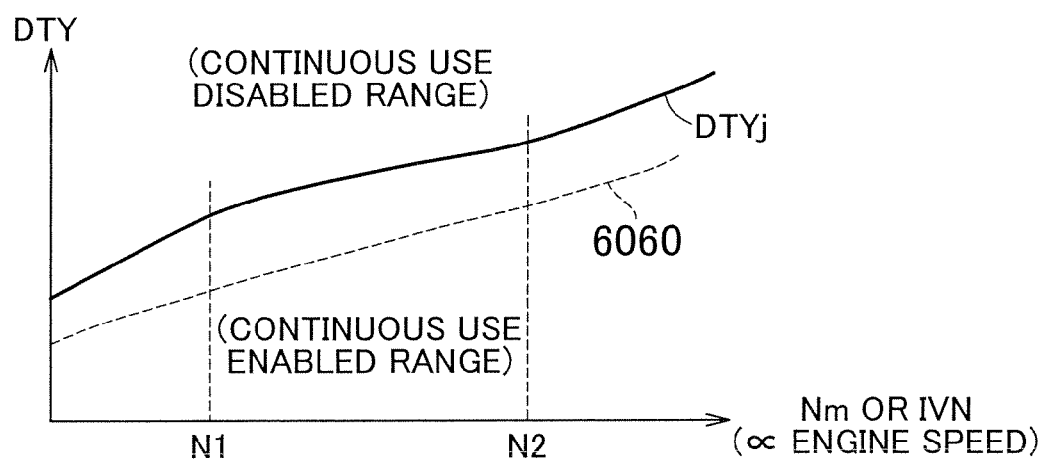
FIG. 15 is a graph illustrating a determination as to whether at least one of the electric motor and the electric-motor EDU has overheated, which is made by the variable valve timing system according to the embodiment of the invention.

As shown in FIG. 15, the variable valve timing system according to the embodiment of the invention makes an overheating determination as to whether the electric motor 2060 that serves as the actuator need to be restricted heating up, based on the result of comparison between the duty ratio DTY for the transistor 4350 set according to Equation 2 and the duty ratio reference value DTYj used as the reference value set by the reference value setting unit 6100 shown in FIG. 12.

More specifically, the range in which the duty ratio DTY is higher than the duty ratio reference value DTYj (DTY>DTYj) is defined as the "continuous use disabled range", while the range in which the duty ratio DTY is equal to or lower than the duty ratio reference value DTYj (DTY≦DTYj) is defined as the "continuous use enabled range". If the duration during which the set duty ratio remains within the continuous use disabled range is equal to or longer than a reference duration, it is determined that at least one of the electric motor 2060 and the electric-motor EDU 4100 has overheated.

As shown in FIG. 15, the duty ratio reference value DTYj that is the reference value used to make an overheating determination is variably set based on the motor speed Nm. The reason will be described in detail below.

The heating characteristic of the electric motor 2060 and the electric-motor EDU 4100 varies from element to element thereof based on the motor speed, and the allowable heating amount also varies from element to element thereof due to the design. For example, in a coil portion of the electric motor 2060 and the transistor 4350 arranged in the electric power conversion circuit 4300 (FIG. 14) that passes electric current through a coil, the tendency to continuously passing motor current through a certain phase becomes stronger as the rotational speed of the electric motor 2060 decreases. Accordingly, whether these portions have overheated needs to be monitored in the low rotational speed range where the electric motor 2060 rotates at a low speed. On the other hand, in the high rotational speed range where the electric motor 2060 rotates at a high speed, the degree to which the coil portion and the transistor (the power semiconductor element) heat up is reduced, while the degree to which the filter coil 4250 (FIG. 14) heats up is relatively increased. Accordingly, whether the filter coil portion has overheated needs to be monitored.

Accordingly, the duty ratio reference value DTYj is set to increase as the motor speed Nm increases, as shown in FIG. 15. As a result, it is possible to more appropriately determine whether at least one of the electric motor 2060 and the electric-motor EDU 4100 has overheated by reflecting the heating characteristics of various portions, which are exhibited in each motor speed range, on the determination. In addition, the temperature of, for example, an engine coolant may be taken into account when the duty ratio reference value DTYj is set. More specifically, at the same motor speed Nm, the duty ratio reference value DTYj may be set to relatively decrease as the temperature of, for example, the engine coolant increases.

The duty ratio DTY is indicated as a typical example of the information indicating the motor supply electric power PWm. Instead of using the duty ratio DTY, the motor supply electric power PWm may be estimated based on the detection values such as the voltage applied to the electric motor 2060 and the magnitude of electric current passing through the electric motor 2060.

As shown in FIG. 12, in the variable valve timing system according to the embodiment of the invention, the rotational speed command value Nmref for the electric motor 2060 is prepared by adding up the relative rotational speed ΔNm corresponding to the amount of change in the phase of the intake valve 1100 and the camshaft rotational speed IVN that is one-half the engine speed. At least one of the electric motor 2060 and the electric-motor EDU 4100 overheats, if the duration during which the electric motor 2060 is continuously supplied with a large motor supply electric power PWm is equal to or longer than a reference duration. Accordingly, the duty ratio reference value DTYj that is the reference value used to make an overheating determination may be set based on the engine speed (or the camshaft rotational speed IVN) instead of the motor speed Nm. The engine speed is smaller in fluctuation than the motor speed Nm. Accordingly, an abrupt change in the reference value is minimized by setting the duty ratio reference value DTYj based on the engine speed. As a result, an overheating determination is made more stably.

The duty ratio reference value DTYj is set to a value that is higher than the duty ratio (the duty ratio indicated by the duty ratio characteristic line 6060 in FIG. 13) corresponding to the motor supply electric power PWm required when the rotational speed ΔNm of the electric motor 2060 relative to the rotational speed of the sprocket 2010 is zero (ΔNm=0) (i.e., when the rotational speed of the electric motor 2060 matches the rotational speed of the intake camshaft 1120).

Figure 16:
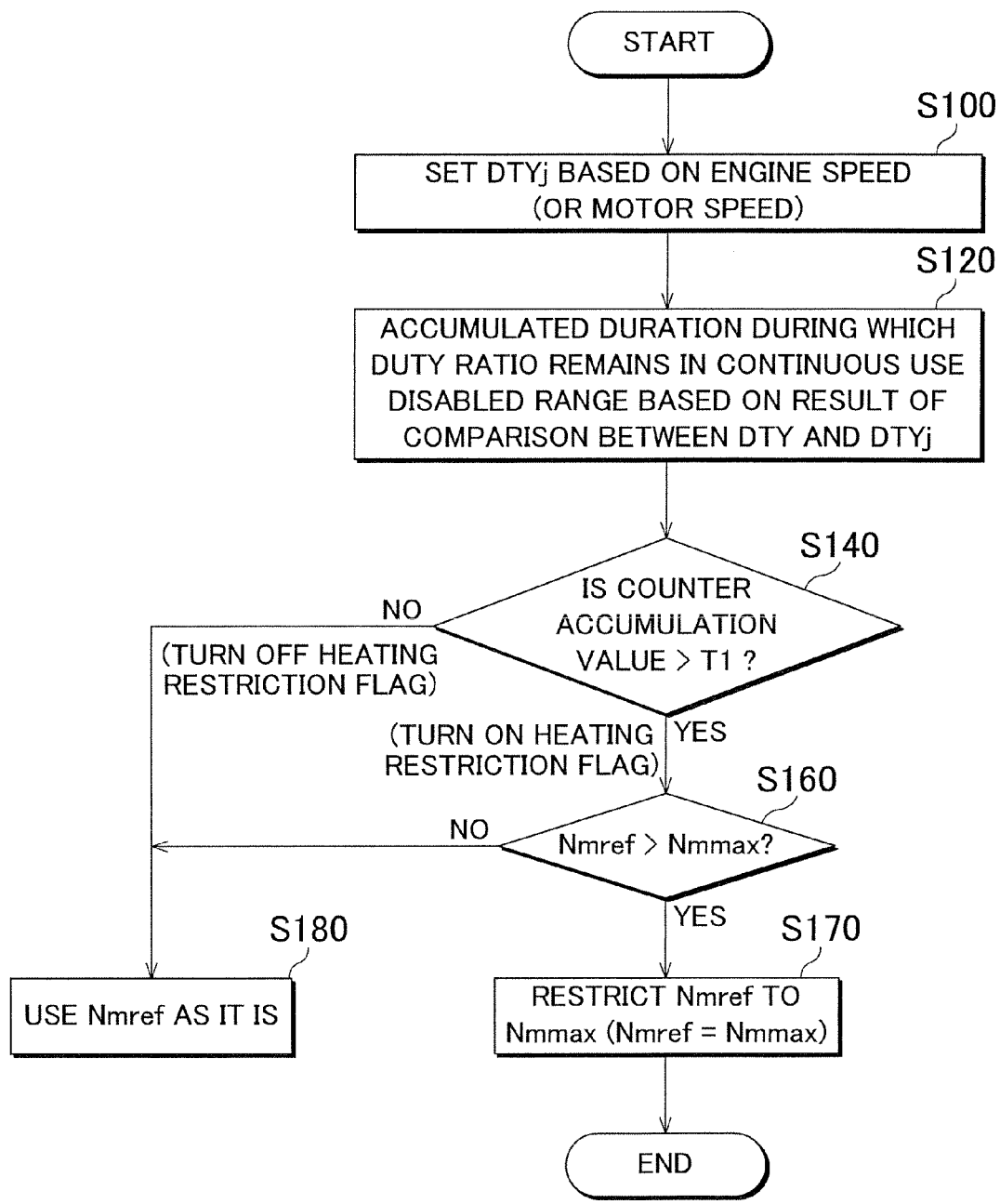
FIG. 16 is a first flowchart illustrating the overheat protection control over the electric motor and the electric-motor EDU, which is executed by the variable valve timing system according to the embodiment of the invention.

FIG. 16 is a flowchart illustrating the overheating protection control over the electric motor 2060 and the electric-motor EDU 4100, which is executed by the variable valve timing system according to the embodiment of the invention. The flowchart shown in FIG. 16 is implemented by executing a predetermined program stored in the ECU 4000 in predetermined control cycles.

As shown in FIG. 16, the ECU 4000 sets, in step S100, the duty ratio reference value DTYj shown in FIG. 15, based on the motor speed or the engine speed (or the camshaft rotational speed IVN). The process in step S100 corresponds to the function of the reference value setting unit 6100 shown in FIG. 12.

The ECU 4000 determines in step S120 whether the current duty ratio DTY is within the continuous use disabled range based on the result of comparison between the duty ratio DTY in the electric-motor EDU 4100 and the duty ratio reference value DTYj calculated in step S100. If it is determined that the current duty ratio DTY is within the continuous use disabled range, the duration during which the duty ratio DTY remains within the continuous use disabled range is accumulated by means of the counter 6210 (hereinafter, referred to as the "counter accumulation value") (FIG. 12).

The ECU 4000 determines in step S140 whether the counter accumulation value is larger than the first reference value T1 corresponding to the first reference duration. If it is determined that the counter accumulation value is larger than the first reference value T1 ("YES" in step S140), it is determined that at least one of the electric motor 2060 and the electric-motor EDU 4100 has overheated and therefore the electric motor 2060 and the electric-motor EDU 4100 need to be restricted from heating up. Accordingly, the heating restriction flag is turned on. On the other hand, when the it is determined that counter accumulation value is equal to or smaller than the first reference value T1 ("NO" in step S140), it is determined that neither the electric motor 2060 nor the electric-motor EDU 4100 has overheated and therefore neither the electric motor 2060 nor the electric-motor EDU 4100 needs to be restricted from heating up. Accordingly, the heating restriction flag is turned off. Namely, the processes in step S120 and S140 correspond to the function of the overheating determination unit 6200 in FIG. 12.

If it is determined that the electric motor 2060 and the electric-motor EDU 4100 need to be restricted from heating up ("YES" in step S140), the ECU 4000 determines in step S160 whether the rotational speed command value Nmref set by the actuator operation amount setting unit 6000 is higher than the maximum rotational speed command value Nmmax.

The maximum rotational speed command value Nmmax is set in accordance with the rotational speed of the electric motor 2060 when the electric motor 2060 is controlled based on the duty ratio reference value DTYj shown in FIG. 15. Setting the duty ratio reference value DTYJ to a value higher than the duty ratio indicated by the duty ratio characteristic line 6060 shown in FIG. 15 makes it possible to both advance and delay the phase of the intake valve 1100 even when the electric motor 2060 and the electric-motor EDU 4100 are restricted from heating up, although the speed at which the phase is changed is limited.

When the rotational speed command value Nmref is higher than the maximum rotational speed command value Nmmax (Nmref>Nmmax) ("YES" in step S160), the ECU 4000 modifies the rotational speed command value Nmref to the maximum rotational speed command value Nmmax (Nmref=Nmmax) in step S170 to restrict the rotational speed of the electric motor 2060. Namely, when the electric motor 2060 and the electric-motor EDU 4100 are restricted from heating up, the rotational speed command value Nmref that will be provided from the ECU 4000 to the electric-motor EDU 4100 is set to a value equal to or lower than the maximum rotational speed command value Nmmax. As a result, the electric motor 2060 is driven at a duty ratio DTY within the continuous use enabled range shown in FIG. 15.

On the other hand, if it is determined that neither the electric motor 2060 nor the electric-motor EDU 4100 needs to be restricted from heating up ("NO" in step S140), or if it is determined that the electric motor 2060 and the electric-motor EDU 4100 need to be restricted from heating up ("YES" in step S140) but it is determined that the rotational speed command value Nmref is equal to or lower than the maximum rotational speed command value Nmmax (Nmref≦Nmmax) ("NO" in step S160), the ECU 4000 transmits a signal indicating the rotational speed command value Nmref set by the actuator operation amount setting unit 6000 to the electric-motor EDU 4100.

With the configuration described above, when the duration during which the set duty ratio DTY, used in the rotational speed control over the electric motor 2060, remains within the continuous use disabled range, in which the electric motor 2060 and the electric motor EDU 4100 easily overheat, is equal to or longer than the reference duration, the rotational speed of the electric motor 2060 is restricted in order to restrict the electric motor 2060 and the electric-motor EDU 4100 from heating up. In this way, it is possible to protect the electric motor 2060 and the electric-motor EDU 4100 from overheating. As a result, the elements of the electric motor 2060 and the electric-motor EDU 4100 are protected from malfunctions.

Next, the operation of the counter 6210 (FIG. 12), executed to increase the duration during which the electric motor 2060 is continuously used at a duty ratio DTY within the continuous use disabled range, will be described. The flowchart shown in FIG. 17 describes the process in step S120 in FIG. 16 in detail.

Figure 17:
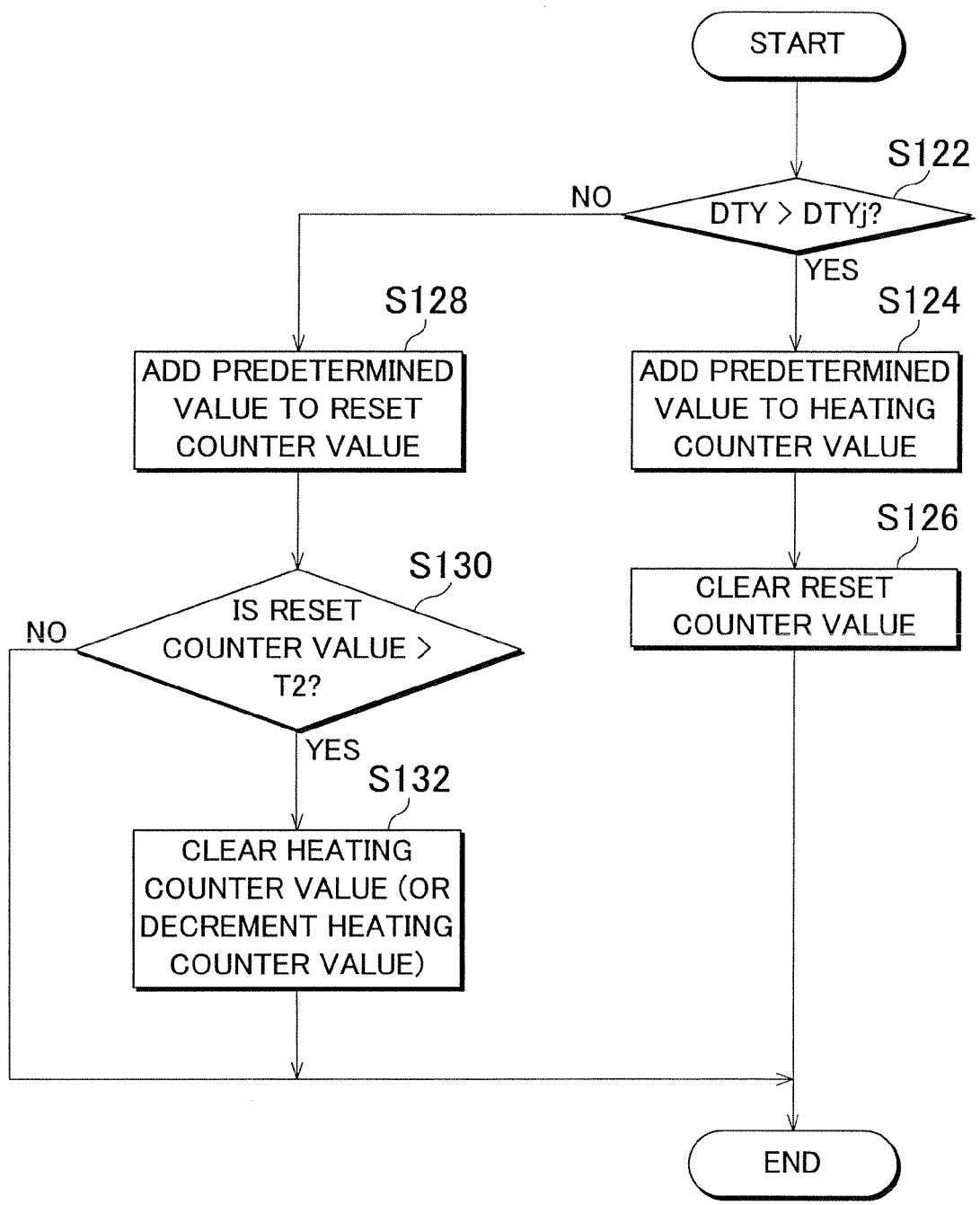
FIG. 17 is a second flowchart illustrating the overheat protection control over the electric motor and the electric-motor EDU, which is executed by the variable valve timing system according to the embodiment of the invention.

As shown in FIG. 17, the ECU 4000 determines in step S122 whether the duty ratio DTY in the electric-motor EDU 4100 is higher than the duty ratio reference value DTYj set in step S100. If it is determined that the duty ratio DTY is higher than the duty ratio reference value DTYj (DTY>DTYj) ("YES" in step S122), the duty ratio DTY is within the continuous use disabled range. Accordingly, the ECU 4000 adds, in step S124, a predetermined addition value to the heating counter value indicated by the counter 6210. The heating counter value corresponds to the counter accumulation value used in step S140 in FIG. 16. The addition value that is added to the heating counter value in step S124 may be variably set based on, for example, the coolant temperature. More specifically, when, for example, the coolant temperature is high and therefore the electric motor 2060 and the electric-motor EDU 4100 easily heatup, the addition value may be set to a value higher than that used when the coolant temperature is not high.

In step S126, the ECU 4000 clears the reset counter value. The reset counter value is counted by the counter 6210 in the manner similar to the manner in which the heating counter value is counted. However, the reset counter value indicates the duration during which the electric motor 2060 is continuously used at a duty ratio DTY within the continuous use enabled range, while the heating counter value indicates the duration during which the electric motor 2060 is continuously used at a duty ratio DTY within the continuous use disabled range.

Because the flowcharts in FIGS. 16 and 17 are executed in predetermined control cycles, the heating counter value is incremented, by executing the process in step S124, in accordance with the duration during which the set duty ratio DTY remains within the continuous use disabled range.

On the other hand, when the duty ratio DTY is equal to or lower than the duty ratio reference value DTYj (DTY≦DTYJ) ("NO" in step S122), the ECU 4000 adds a predetermined addition value to the reset counter value in step S128. The addition value may be variably set based on, for example, the engine coolant temperature. More specifically, when the temperature is not high and therefore the electric motor 2060 easily releases heat, the addition value may be set to a value which is higher than that used when the temperature is high.

Then, the ECU 4000 determines in step S130 whether the reset counter value is larger than the second reference value T2 corresponding to the second reference duration. If it is determined that the reset counter value is larger than the predetermined value T2 ("YES" in step S130), namely, when the duration during which the set duty ratio DTY remains within the continuous use enabled range is equal to or longer than the second duration, the ECU 4000 clears the heating counter value or subtracts a predetermined value from the heating counter value. On the other hand, if a negative determination is made in step S130, the ECU 4000 ends the control routine without executing step S132.

By executing the control routine shown in FIG. 17, the duration during which the electric motor 2060 is continuously used at a duty ratio DTY within the continuous use disabled range is indicated by the heating counter value. When the heating counter value exceeds the reference value T1, restriction on the electric motor 2060 and the electric-motor EDU 4100 from heating up is started. If the duty ratio is shifted from the continuous use disabled range to the continuous use enabled range due to the restriction on the electric motor 2060 and the electric-motor EDU 4100 from heating up, the heating counter value is cleared or decremented when the duration during which the electric motor 2060 is continuously used at a duty ratio DTY within the continuous use enabled range becomes equal to or longer than the second reference duration (corresponding to the reference value T2). Then, a negative determination is made in step S140 (FIG. 16), and the restriction on the electric motor 2060 and the electric-motor EDU 4100 from heating up is cancelled.

In this case, the heating counter value is maintained until the duration during which the set duty ratio DTY remains within the continuous use enabled range exceeds the reference duration. Accordingly, it is possible to prevent the situation where the heating counter value is cleared or decremented and the restriction on the electric motor 2060 and the electric-motor EDU 4100 from heating up is undesirably cancelled before overheating of the electric motor 2060 and the electric-motor EDU 4100 is reliably eliminated. Preferably, the reference value T2 (S130) that indicates the duration during which the heating counter value is maintained is changed based on whether the heating restriction flag is on or off. The reason for this will be described in detail below. When the electric motor 2060 and the electric-motor EDU 4100 are restricted from heating up (when the heating restriction flag is on), it takes relatively long to eliminate overheating of the electric motor 2060 and the electric-motor EDU 4100. Accordingly, the duration during which the heating counter value is maintained needs to be long (the reference value T2 needs to be large). On the other hand, when neither the electric motor 2060 nor the electric-motor EDU 4100 is restricted from heating up (when the heating restriction flag is off), the electric motor 2060 is used in the continuous use enabled range. Accordingly, it is estimated that the temperature of the electric motor 2060 and the electric-motor EDU 4100 will be reduced promptly. Therefore, the duration during which the heating counter value is maintained is preferably shorter than that when the heating restriction flag is on (the reference value T2 is preferably smaller than that when the heating restriction flag is on). In this way, it is possible to prevent the situation where the efficiency of the intake valve phase control is reduced by excessively executing the overheating protection control over the electric motor 2060 and the electric-motor EDU 4100.

According to the embodiment of the invention described above, the reference value used to determine whether the actuator has overheated is variably set in accordance with the rotational speed of the electric motor 2060 with the characteristics of the variable valve timing system taken into account. Thus, whether the actuator has overheated is appropriately determined, and the overheating protection control is appropriately executed. Therefore, it is possible to protect the elements of the electric motor 2060 and the electric-motor EDU 4100 from malfunctions by preventing the electric motor 2060 that serves as the actuator and the electric-motor EDU 4100 from overheating, and to prevent reduction in the efficiency of the valve timing control due to excessive execution of overheating protection control.

Whether at least one of the electric motor 2060 and the electric-motor EDU 4100 has overheated is determined based on the electric power supplied to the electric motor 2060. Accordingly, a temperature sensor is not required to make an overheating determination. In addition, it is possible to effectively restrict the electric motor 2060 and the electric-motor EDU 4100 from heating up, based on an actual increase in the temperature, in order to prevent the electric motor 2060 and the electric-motor EDU 4100 from overheating.

In the embodiment of the invention described above, the intake VVT mechanism 2000 may be regarded as a "changing mechanism" according to the invention. The electric-motor EDU 4100 may be regarded as an "electric motor drive unit" according to the invention. The actuator operation amount setting unit 6000 may be regarded as a "command value preparation unit" according to the invention. The reference value setting unit 6100 and step S100 (FIG. 16) may be regarded as a "reference value setting unit" according to the invention. The overheating determination unit 6200 and steps S120 and S140 (FIG. 16) may be regarded as an "overheating determination unit" according to the invention. The rotational speed command value restriction unit 6300 and steps 160 and S170 (FIG. 16) may be regarded as a "command value restriction unit" according to the invention.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A variable valve timing system that changes opening/closing timing of at least one of an intake valve and an exhaust valve provided in an engine and opened/closed by a camshaft, comprising:
    a changing mechanism that changes the opening/closing timing of the intake valve or the exhaust valve in accordance with an operation amount of an actuator that uses an electric motor;
    a command value preparation unit that obtains a current value of the opening/closing timing at least based on a signal from a sensor that detects a rotational speed of the camshaft and a signal from a sensor that detects a rotational speed of the electric motor, and that prepares an operation command value for the electric motor based on a deviation of the current value of the opening/closing timing from a target value of the opening/closing timing, which is set based on an operating state of the engine, such that the opening/closing timing changes in accordance with the target value;
    an electric motor drive unit that controls an amount of electric power supplied to the electric motor such that the electric motor operates in accordance with the operation command value provided from the command value preparation unit;
    a reference value setting unit that variably sets a reference value used to control the amount of electric power supplied from the electric motor drive unit to the electric motor in accordance with one of the rotational speed of the electric motor and a rotational speed of the engine, wherein the reference value is used for an overheating determination;
    an overheating determination unit that determines whether at least one of the electric motor and the electric motor drive unit needs to be restricted from heating up based on a result of comparison between information indicating the amount of electric power supplied from the electric motor drive unit to the electric motor and the reference value; and
    a command value restriction unit that restricts the operation command value for the electric motor to a value within a predetermined range when the overheating determination unit determines based on the result of the comparison between information indicating the amount of electric power supplied from the electric motor drive unit to the electric motor and the reference value, that at least one of the electric motor and the electric motor drive unit needs to be restricted from heating up.

2. The variable valve timing unit according to claim 1, wherein the overheating determination unit determines that at least one of the electric motor and the electric motor drive unit needs to be restricted from heating up, when a duration during which the amount of electric power supplied to the electric motor, which is indicated by the information, is continuously larger than the reference value is longer than a first reference duration.

3. The variable valve timing unit according to claim 2, wherein after determining that the at least one of the electric motor and the electric motor drive unit needs to be restricted from heating up, the overheating determination unit determines that restriction on the electric motor and the electric motor drive unit from heating up is no longer required, when a duration during which the amount of electric power supplied to the electric motor, which is indicated by the information, is continuously equal to or smaller than the reference value is longer than a second reference duration.

4. The variable valve timing unit according to claim 2,
wherein the overheating determination unit includes an accumulation unit that accumulates the duration during which the amount of electric power supplied to the electric motor, which is indicated by the information, is continuously larger than the reference value, the duration accumulated by the accumulation unit is cleared when a duration during which the amount of electric power supplied to the electric motor, which is indicated by the information, is continuously equal to or smaller than the reference value is longer than a second reference duration, and the second reference duration used when the overheating determination unit determines that at least one of the electric motor and the electric motor drive unit needs to be restricted from heating up is set to be longer than the second reference duration used when the overheating determination unit determines that restriction on the electric motor and the electric motor drive unit from heating up is not required.

5. The variable valve timing unit according to claim 1,
wherein the changing mechanism changes the opening/closing timing of the intake valve or the exhaust valve in a direction, which is determined based on whether the rotational speed of the electric motor relative to the rotational speed of the camshaft that drives the intake valve or the exhaust valve takes a positive value or a negative value, and at a rate that is determined based on a degree of the rotational speed of the electric motor relative to the rotational speed of the camshaft, the command value preparation unit prepares a rotational speed command value for the electric motor as the operation command value by adding the rotational speed of the electric motor relative to the rotational speed of the camshaft, which corresponds to the deviation of the current value of the opening/closing timing from the target value of the opening/closing timing, to the rotational speed of the camshaft, and the electric motor drive unit controls the amount of electric power supplied to the electric motor such that the rotational speed of the electric motor matches the rotational speed command value.

6. The variable valve timing system according to claim 1, wherein the information indicating the amount of electric power supplied from the electric motor drive unit to the electric motor is a duty ratio at which the electric motor is driven.

7. The variable valve timing system according to claim 1, wherein
the predetermined range used by the command value restriction unit is set based on the rotational speed of the engine, and the predetermined range is set to include a region where the rotational speed of the electric motor is higher than the rotational speed of the camshaft, a region where the rotational speed of the electric motor is lower than the rotational speed of the camshaft, and a region where the rotational speed of the electric motor is equal to the rotational speed of the camshaft.

8. The variable valve timing system according to claim 1, wherein the reference value is set to increase as the rotational speed of one of the electric motor and the engine increases.

9. The variable valve timing unit according to claim 1, wherein the reference value is variably set in accordance with a camshaft rotational speed.

10. The variable valve timing unit according to claim 1, wherein the reference value is variably set based on a temperature of an engine coolant.

11. The variable valve timing unit according to claim 10, wherein the reference value is set to decrease as the temperature of the engine coolant increases.

12. A method for controlling a variable valve timing system that changes opening/closing timing of at least one of an intake valve and an exhaust valve provided in an engine and opened and closed by a camshaft, and that includes a changing mechanism that is structured to change the opening/closing timing of the intake valve or the exhaust valve in accordance with an operation amount of an actuator that uses an electric motor; and an electric motor drive unit that controls an amount of electric power supplied to the electric motor to drive the electric motor, comprising:

obtaining a current value of the opening/closing timing at least based on a signal from a sensor that detects a rotational speed of the camshaft and a signal from a sensor that detects a rotational speed of the electric motor, and preparing an operation command value for the electric motor based on a deviation of the current value of the opening/closing timing from a target value of the opening/closing timing, which is set based on an operating state of the engine, such that the opening/closing timing changes in accordance with the target value;

controlling the amount of electric power supplied from the electric motor drive unit to the electric motor in accordance with the operation command value;

variably setting a reference value used to control the amount of electric power supplied from the electric motor drive unit to the electric motor in accordance with one of the rotational speed of the electric motor and a rotational speed of the engine, the reference value being used for an overheating determination;

determining whether at least one of the electric motor and the electric motor drive unit needs to be restricted from heating up based on a result of comparison between information indicating the amount of electric power supplied from the electric motor drive unit to the electric motor and the reference value; and restricting the operation command value for the electric motor to a value within a predetermined range, when it is determined based on the result of the comparison between information indicating the amount of electric power supplied from the electric motor drive unit to the electric motor and the reference value, that at least one of the electric motor and the electric motor drive unit needs to be restricted from heating up.

13. The method according to claim 12, wherein it is determined that at least one of the electric motor and the electric motor drive unit needs to be restricted from heating up, when a duration during which the amount of electric power supplied to the electric motor, which is indicated by the information, is continuously larger than the reference value is longer than a first reference duration.

14. The method according to claim 13, wherein after it is determined that the at least one of the electric motor and the electric motor drive unit needs to be restricted from heating up, it is determined that restriction on the electric motor and the electric motor drive unit from heating up is no longer required when a duration during which the amount of electric power supplied to the electric motor, which is indicated by the information, is continuously equal to or smaller than the reference value is longer than a second reference duration.

15. The method according to claim 13, wherein the duration during which the amount of electric power supplied to the electric motor, which is indicated by the information, is continuously larger than the reference value is accumulated in order to determine whether at least one of the electric motor and the electric motor drive unit needs to be restricted from heating up, the accumulated duration is cleared when a duration during which the amount of electric power supplied to the electric motor, which is indicated by the information, is continuously equal to or smaller than the reference value is longer than a second reference duration, and the second reference duration used when it is determined that at least one of the electric motor and the electric motor drive unit needs to be restricted from heating up is set to be longer than the second reference duration used when it is determined that restriction on the electric motor and the electric motor drive unit from heating up is not required.

16. The method according to claim 12, wherein the changing mechanism changes the opening/closing timing of the intake valve or the exhaust valve in a direction, which is determined based on whether the rotational speed of the electric motor relative to the rotational speed of the camshaft that drives the intake valve or the exhaust valve takes a positive value or a negative value, and at a rate that is determined based on a degree of the rotational speed of the electric motor relative to the rotational speed of the camshaft, a rotational speed command value for the electric motor is prepared as the operation command value by adding the rotational speed of the electric motor relative to the rotational speed of the camshaft, which corresponds to the deviation of the current value of the opening/closing timing from the target value of the opening/closing timing, to the rotational speed of the camshaft, and the electric motor drive unit controls the amount of electric power supplied to the electric motor such that the rotational speed of the electric motor matches the rotational speed command value.

17. The method according to claim 12, wherein the information indicating the amount of electric power supplied from the electric motor drive unit to the electric motor is a duty ratio at which the electric motor is driven.

18. The method according to claim 12, wherein the predetermined range is set based on the rotational speed of the engine, and the predetermined range is set to include a region where the rotational speed of the electric motor is higher than the rotational speed of the camshaft, a region where the rotational speed of the electric motor is lower than the rotational speed of the camshaft, and a region where the rotational speed of the electric motor is equal to the rotational speed of the camshaft.

19. The method according to claim 12, wherein the reference value is set to increase as the rotational speed of one of the electric motor and the engine increases.

20. The method according to claim 12, further comprising:
monitoring heating characteristics of a plurality of portions of the electric motor before variably setting the reference value.

* * * * *